J. C. TRIPP.
ATTACHMENT FOR AUTOMOBILE HEADLIGHTS.
APPLICATION FILED FEB. 24, 1919.
1,323,616.
Patented Dec. 2, 1919.
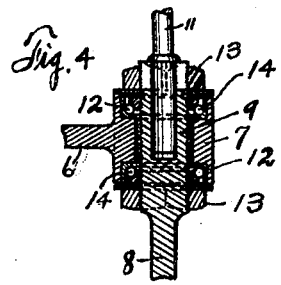
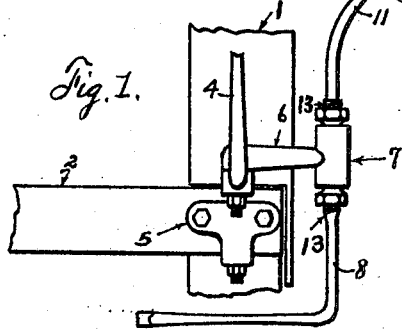
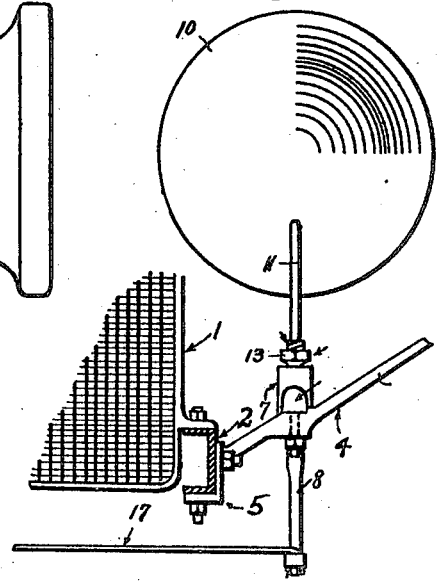
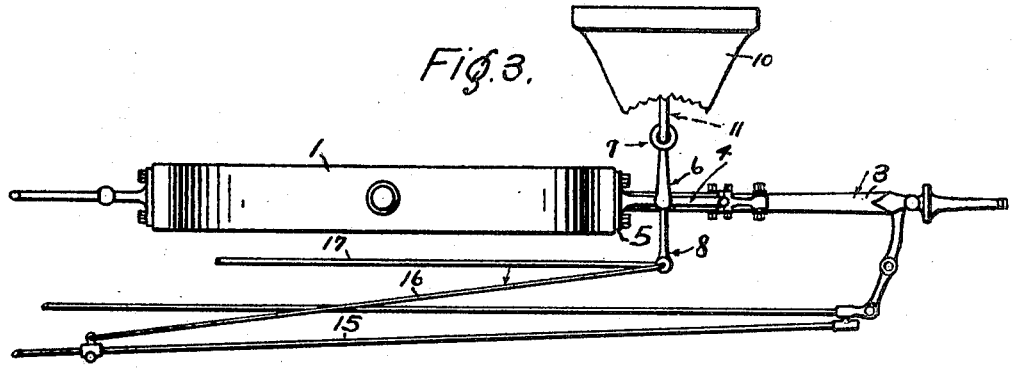
INVENTOR.
John C. Tripp,
BY
Hardaway Cathy
ATTORNEYS.

UNITED STATES PATENT OFFICE.

JOHN C. TRIPP, OF SWEENEY, TEXAS, ASSIGNOR OF ONE-HALF TO D. M. RIMMER, OF SWEENEY, TEXAS.

ATTACHMENT FOR AUTOMOBILE-HEADLIGHTS.

1,323,616.  Specification of Letters Patent.  Patented Dec. 2, 1919.

Application filed February 24, 1919. Serial No. 278,579.

*To all whom it may concern:*

Be it known that JOHN C. TRIPP, a citizen of the United States, residing at Sweeney, in the county of Brazoria and State of Texas, has invented certain new and useful Improvements in Attachments for Automobile-Headlights, of which the following is a specification.

This invention relates to new and useful improvements in automobile headlights.

One object of the invention is to provide vehicle headlights mounted upon supports, which are capable of horizontal rotation, whereby said lights may be turned in the direction in which the vehicle is traveling, in turning corners or going around curves, thereby keeping the road in front of the vehicle at all times, visible.

Another object of the invention is to provide vehicle headlights of the character described, which are operatively connected with the steering mechanism, whereby they will operate in unison with said mechanism, to automatically turn the lights as the vehicle is steered.

A further feature of the invention resides in the provision of vehicle headlights of the character described, which are simple in construction and operation, and which may be readily applied to any form of motor vehicles.

With the above and other objects in view, the invention has particular relation to certain novel features of construction, operation and arrangements of parts, an example of which is given in this specification and illustrated in the accompanying drawings, wherein:

Figure 1, is a side view of one of the headlights, attached to a vehicle and embodying my invention.

Fig. 2, is a rear view thereof,

Fig. 3, is a plan view thereof, and

Fig. 4, is a fragmentary vertical sectional view.

Referring now more particularly to the drawings, wherein like numerals of reference designate similar parts in each of the figures, the numeral 1 refers to the vehicle radiator, which is supported by the side members of the chassis, only one of which is shown, the same being indicated by the numeral 2. The numeral 3, designates the front axle, and the numeral 4, refers to the front fender brace, the inner end of which is secured to the side member 2, by means of the bracket 5. Secured to the brace 4, is the supporting arm 6, which extends forwardly, and whose free end carries the tubular vertical bearing 7, which is held rigidly in fixed position by means of said supporting arm 6. The numeral 8 refers to a crank arm, whose upper end is formed into a split socket member 9, which fits up through the bearing 7, and whose lower end is turned rearwardly. The headlight 10 is fixed upon the upper end of the stem 11, and the lower end of this stem is fitted into the socket of the member 9. Within the upper and lower ends of the bearing 7, there is fitted the ball races 12, 12, and the cone nuts 13, 13, are threaded onto the upper and lower ends, respectively, of the socket member 9, and interposed between said ball races and cone nuts, are the anti-friction members 14. The upper nut 13, when screwed upon the split socket member 9, causes it to grip the lower end of the stem 11, and securely hold it against detachment, and the bearings above described permit the arm 8 to turn freely. The numeral 15 designates the connecting rod of the automatic steering gear, and when moved to the right, will assist in steering a car, the motion being communicated to the steering wheels in the usual manner. Attached to this rod 15, at one end, and to the rearwardly turned end of the crank arm 8, at its other end, there is a link 16, through which the headlight 10 is rotated, or turned horizontally, through the mechanism just described, as the steering wheels are turned.

In the drawings, only one headlight is shown. However, it is intended that both of said headlights may be similarly constructed as desired, and if similarly constructed, the rear ends of the arms 8 will be connected by the cross rod 17, and thereby both headlights may be made to move simultaneously.

What I claim is:

An automobile headlight including a supporting arm fixed to the vehicle frame, and whose forward end is formed into a vertical bearing member, a crank arm one end of which is formed into a split socket which fits into said bearing member, a headlight, a stem to which said headlight is fixed, one end of said stem fitting in the socket of said socket member, cone nuts threaded onto said socket member, and which fit into the upper and lower ends, respectively of said bearing, anti-friction means interposed between said cone nuts and said bearing, and an actuating link connected at one end to the vehicle steering mechanism, and at its other end to the rear end of said crank arm.

In testimony whereof he has signed his name to this specification in the presence of two subscribing witnesses.

JOHN C. TRIPP.

Witnesses:
CHARLES F. ELLIS,
J. E. ORR.